United States Patent
Zirwas

(10) Patent No.: US 7,412,253 B2
(45) Date of Patent: Aug. 12, 2008

(54) METHOD AND DEVICES FOR CONTROLLING THE EMISSION POWER OF A COMMUNICATION SYSTEM

(75) Inventor: Wolfgang Zirwas, Gröbenzell (DE)

(73) Assignee: Siemens Aktiengesellschaft, Munich (DE)

(*) Notice: Subject to any disclaimer, the term of this patent is extended or adjusted under 35 U.S.C. 154(b) by 574 days.

(21) Appl. No.: 10/486,729

(22) PCT Filed: Aug. 19, 2002

(86) PCT No.: PCT/EP02/09261

§ 371 (c)(1),
(2), (4) Date: Feb. 13, 2004

(87) PCT Pub. No.: WO03/017524

PCT Pub. Date: Feb. 27, 2003

(65) Prior Publication Data

US 2004/0214592 A1     Oct. 28, 2004

(30) Foreign Application Priority Data

Aug. 17, 2001   (EP)   ................. 01119922

(51) Int. Cl.
*H04B 7/00* (2006.01)
(52) U.S. Cl. .................. 455/522; 455/69
(58) Field of Classification Search ............... 455/522, 455/69, 272

See application file for complete search history.

(56) References Cited

U.S. PATENT DOCUMENTS 6,075,969 A * 6/2000 Lusignan ............... 455/272
2002/0049068 A1* 4/2002 Koo et al. ............... 455/522

* cited by examiner

*Primary Examiner*—Philip J. Sobutka
(74) *Attorney, Agent, or Firm*—Bell, Boyd & Lloyd LLP

(57) ABSTRACT

The invention relates to a method for controlling the emission power of an especially mobile emission station (MT). The aim of the invention is to keep the emission power to a minimum. To this end, a reception station (AP) which receives the emitted data (c1) as reception data (c1*) determines the measuring values of the same, and sends them to the emission station (MT) via a secure connection (DL) which is not, or is only slightly, affected by disturbances. The measuring values (c1*) depend on the data (c1) transferred by the signal.

13 Claims, 1 Drawing Sheet

METHOD AND DEVICES FOR CONTROLLING THE EMISSION POWER OF A COMMUNICATION SYSTEM

FIELD OF TECHNOLOGY

The invention relates to a method and to devices for controlling the emission power in a communications system.

BACKGROUND

In communications systems, especially those operating in accordance with the GSM (Global System for Mobile communications) or UMTS (Universal Mobile Telecommunications System) standards, data or information is transmitted between a subscriber-side station and a network-side base station over radio interfaces. To set the required emission power in such cases what is known as the Shannon capacity is to be taken into account in each case. The Shannon capacity specifies the maximum volume of data or information that can be sent over a channel when the channel is affected by normal disturbance factors, including noise. The Shannon capacity thus specifies a relationship between emission power and signal-to-noise ratio which may not be exceeded if the receive quality is to be sufficient.

Noting the fact that the subscriber-side stations are mostly mobile stations with a portable energy source, research has long been directed towards minimizing the required signal-to-noise ratio for data transmission in wireless radio communications systems. In addition to the radio communications systems already mentioned, this typically also involves data networks, e.g. in accordance with the HiperLAN2 standard. To allow sending with the lowest possible emission power various methods of error correction have been developed, for example the method known as Forward Error Correction (FEC) referred to as Block FEC, Convolutional FEC, Turbo FEC or Coding FEC. Further error correction methods are what are known as ARQ (ARQ: Automatic Repeat Request) schemes, in which redundant data is transmitted, adaptive modulation methods and so on.

With these type of error correction methods there are especially methods in which a downlink channel is used from the receiver to the original sender, for example to retroactively request a retransmission of incorrect data symbols or, in the case of incremental redundancy, to request more redundancy to be transmitted, as with the ARQ method for example.

BRIEF SUMMARY

The object of the invention is to propose an alternative method for reducing the required emission power, in particular of a mobile station, as well as the corresponding devices for executing such a method.

This object is achieved by a method for controlling the send parameters for emitting data with the features of patent claim 1 or devices for executing such a method with the features of patent claims 12 and 13.

The method for controlling the emission power of a sending station makes provision for the sending station to send a signal for transmitting data to a receiving station, for the receiving station to determine a measured value that is dependent on the data transmitted by the signal and transmit it to the sending station as control information for controlling its emission power.

In the case of amplitude modulation of the signal transmitted from the sending station the measured value can be analog power values of the receiving signal, also referred to below as reception power amplitude values. In the case of phase modulation of the signal to be transmitted the value can also be a phase angle for example which has been determined for an item of data received in the receiving station. For an analog measured value transferred to the sending station the value concerned is therefore one that, although it depends on data to be transmitted to the receiving station with the signal, will be determined before demodulation in the receiving station.

With phase modulation a number of items of data to be transmitted will often be combined into one modulation symbol which will then be used for modulation of the carrier. In this case the measured value in accordance with the invention relates to one of the symbols received with the signal. The individual data of the modulation symbol are only retrieved again after demodulation has taken place, which occurs after the measured value has been determined.

By sending back measured values (in the form of analog power values of received data for example) to a station originally sending this data, the originally sending station can check directly whether the data sent out was sufficiently correctly received. If it was not, an appropriate correction can be made to the emission power for subsequent send processes. Checking whether a sufficient receive quality is available is thus not undertaken on the receive side but on the send side.

Advantageous embodiments are the object of dependent claims.

Sending back of the measured values (in the form of the analog power values for example) can in such cases be performed in such a way that further disturbance effects are practically negligible during transmission of the measured values so that the measured values sent back will be correctly received in the sending station. To make this possible the signals are preferably sent back from the receiving station with significantly higher power than the emission power with which the data originally sent was emitted from the sending station. Coding and/or redundancy methods can also be usefully employed here to ensure that the measured values are sent in the downlink direction without errors. One thing that this procedure allows is very low send energy to be used at the sending station for which the energy consumption is to be reduced as much as possible and another is the sending back of the measured values to be undertaken independently of the required amount of energy to be used. This is of advantage if the sending station involved is a mobile subscriber station with limited battery power and the receiving station is a base station with no restriction as to power supply.

For the case of a fault established by the sending station and which cannot be tolerated during the original sending of data via the interface the sending station can send out correction data for the previously sent data to the receiving station communicating with it. This type of correction data can consist of a correction factor or an additive correction value. However it is also possible to also just have the original data sent again as correction data, typically with higher transmit energy.

Especially useful however (where the measured value is an analog power value) is repeated sending of the original data as correction data, in which case the correction data can then consist of the original data from which advantageously an appropriate difference value between the originally sent power value and the analog power value received on the receiver side is inserted or removed so that on the receiver side an addition of the received data from the same data origin can be undertaken. The adding of an original data value and this type of correction data value as well as division by two would lead on the receiver side to a corrected data value which, in the case where the correction data has been transmitted without any errors creates the originally sent data value.

Particularly useful here however is not only the fact that the data value is transmitted twice as a data value and as a correction of this data value, but the repeated transmission of this data value with a correction applied in each case. In this case after the data value first transmitted has been received in each case as well as the correction data value received later the received analog power values can be transmitted in the downlink direction to the sending station so that the latter can add or subtract any appropriate new correction value to the correction data of the repeated transmission sequence subsequently to be sent. The more of this type of transmitted data or correction data is stacked on the receiver side the smaller the effect is in the final analysis of noise on the radio interface.

Especially with a view to the last correction data value to be sent for which there is no return transmission of its measured value received on the receiver side (e.g. as an analog power value) a statistical evaluation can also be performed to enable a noise value which is not random to be generated or a non-random additive or multiplicative noise value to be established. This means that the correction data to be transmitted subsequently, especially the correction data value to be transmitted last, can be corrected in addition to the result of the last return transmission.

The sending station and receiving station in accordance with invention feature the components necessary to execute the method in accordance with the invention and are designed appropriately for their execution.

A camera for optically recording images and/or sequences of images and optional sound signals for electronic output of previously recorded images to a remote communication system device as receiving station via a radio interface is especially advantageous as a sending station with low transmit power. In this way pictures with higher resolution, that is pictures with a very high memory requirement can be recorded and stored without over filling the generally very limited availability of memory space with just a few individual pictures or with correspondingly higher resolution without even a single picture.

BRIEF DESCRIPTION OF THE DRAWINGS

Additional features and advantages of the present invention are described in, and will be apparent from, the following Brief Description of the Drawings and the Detailed Description.

DETAILED DESCRIPTION

Figure 1:
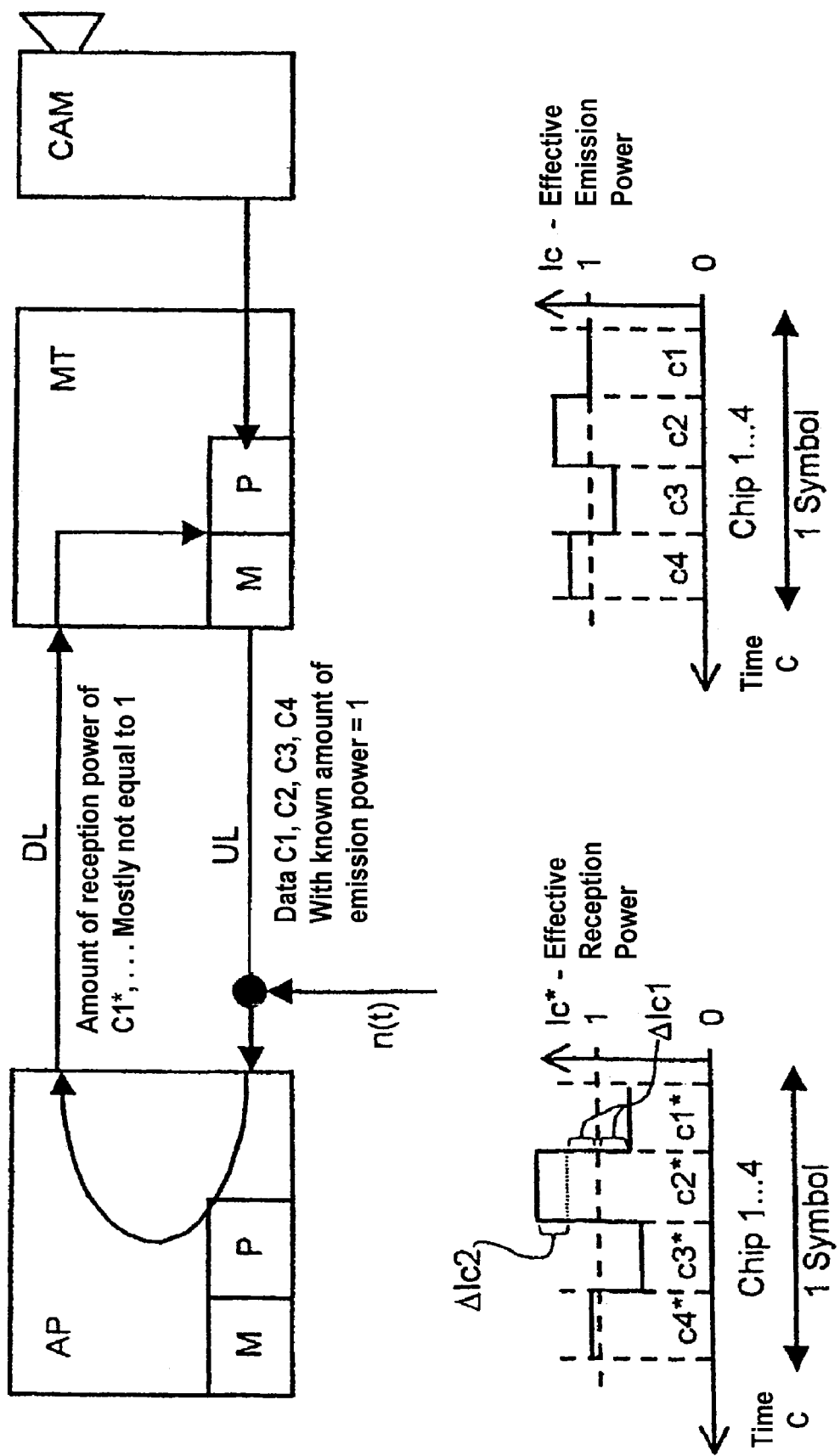
FIG. 1 illustrates an exemplary arrangement with a communications interface and a station sending data over this interface as well as a station receiving this data with power values of data values sent consecutively mapped below the stations.

Whereas in typical communication systems, especially in radio communications systems, a plurality of different types of the devices are provided on the network side to communicate via individual base stations or access points AP with one or more subscriber-side stations MT, the method described below can already be used for communication between two individual stations AP, MT, as shown in FIG. 1.

In the present exemplary embodiment data $c_1 \ldots c_4$ is present in a first, e.g. subscriber-side station MT, which will referred to hereafter as the sending station MT, which is to be sent via a radio interface V to a station AP communicating with the sending station MT. In order to better identify it, this station receiving the data $c_1 \ldots c_4$ will be identified as the receiving or returning station AP (AP: Access Point). At interface V, which is preferably designed as a radio interface, transmissions in the uplink direction UL will be transferred from the sending station MT to the receiving station AP, for example via an uplink connecting channel of a communications system. Furthermore data or information will be sent back from the receiving station AP to the sending or originally sending station MT via the interface V in the downlink direction DL, especially via a downlink connection channel of a communications system. As a rule the terms data, information and signaling are generally applicable. Without any intentional restriction they stand for traffic or communication between two stations.

The actual data source can be designed in different ways, for example with a microphone to record speech data, but can especially consist of an optical recording device for recording images or sequences of images. Especially in the case of an optical recording device it is possible to link the sending station MT with a camera CAM for recording images via an appropriate interface or to equip such a camera CAM directly with a corresponding communication device or station MT that can send in this way.

This makes it possible to send pictures or their data recorded by the camera CAM directly or after buffering to a correspondingly suitable device in the communications network. Such a device can for example be a monitor for monitoring purposes, but can also be a large-volume storage device in which a plurality of these types of pictures or pictures with extremely high resolution and correspondingly extremely high data rate can be stored. This means that the camera CAM is not restricted to recording images until its own memory is full. Particularly advantageous is an embodiment in which the image data which is recorded by the camera CAM is transmitted via the sending station MT, the radio interface V and a receiving station AP, with the receiving station AP on its side making it possible to access the internet for example in order to forward the data in a form in accordance with the internet protocol (IP), in which case, in a particularly advantageous embodiment, the final receiving device can be the personal computer (PC) of the person who is operating the camera CAM.

With the method described below it is assumed that the connection, especially a radio connection, is relatively good in the uplink direction or downlink direction from the original receiving station AP to the original sending station MT. A relatively good connection can be obtained by the sending station MT being located close to the receiving station AP, by the receiving station using a very high emission power $Ic^*$ for sending back and/or special coding or redundancy methods being used for sending back in the downlink direction from the receiving station AP to the original sending station MT.

The greatest proportion of energy consumption in transmission of data typically occurs in the high frequency part, that is in the power amplifier of the send device. Especially in the case of one-chip solutions, the required power for data processing in comparison to the required amplification power can normally be disregarded. While the network-side stations for communication systems normally have a sufficient power feed available from the fixed network connection so that the power consumption only represents a lower criterion, the power consumption of mobile stations which carry their own energy source is not negligible.

With the exemplary embodiment considered here the emission power Ic from the mobile, subscriber-side sending station MT to the receiving, especially network-side station AP should be minimized as much as possible, whereas in the reverse direction for sending back data and information there should be no power restriction, or in order to ensure an errorfree transmission, even a particularly high level of energy should be used for sending the data.

It can be especially advantageous when the downlink channel from the original receiving station AP to the original sending station MT compared to the known error correction method, that is for example compared to a low data-rate ARQ channel, is expanded into a channel with a high or very high data rate. This makes it possible, in the downlink direction from the original receiving station AP to the original sending station MT, to transmit the analog power values of the received data or data symbols previously determined on the receiver side back to the original sender. Although the overall spectral effectiveness of the communications system is much reduced by this method of operation since the high proportion of data in the downlink channel DL blocks the transmission of useful data, the procedures described below can advantageously be employed to greatly lower the power consumption in the original sending station MT, which is very valuable for specific applications.

In accordance with the preferred exemplary embodiment, as is shown in the Figure, data c is sent out in a first step as data value $c_1$ with a specific emission power, e.g. $Ic_1=1$. During the transmission via interface V in an uplink direction UL a noise signal $n(t)$ affects the transmitted data $c_1$. The noise signal involved $n(t)$ can be both statistical noise, known as white noise, but also electromagnetic disturbance effects of other power sources with electromagnetic emissions.

Thus at the receiving station AP instead of the sent data value $c_1$ with an emission power $Ic_1=1$, a data value $c_1^*$ with a received receive signal power $Ic_1^*$ is received, in which case this reception power $Ic_1^*$ is generally not equal to 1 because of the effect of the noise signal $n(t)$, i.e. $Ic_1^*<>1$. In the receiving station AP the corresponding analog power value $Ic_1^*$ for the received data value $c_1^*$ is determined and sent back via interface V in the downlink direction DL to the originally sending station MT. To do this the analog power value $Ic_1^*$ is usefully converted into a digital value which is then sent back as a digital signal.

In the original sending station MT the received, returned analog power value $Ic_1^*$ is compared with the emission power value $Ic_1$ and the power difference $\Delta Ic_1$ is determined.

In a second step for transmitting the original data value $c_1$ an emission power correction is performed, taking into account the power difference $\Delta Ic_1$ determined. Subsequently to do this for the preferred exemplary embodiment the original data value $c_1$ plus the defined difference power $\Delta Ic_1$ are combined into a correction data value $c_2$, in which case the power difference $\Delta Ic_1$ in the case of a power $Ic_1^*$ originally received too low on the receiver side is added in to form data correction value $c_2$, whereas in the case of a power $Ic_2^*$ received too high on the receiver side it is subtracted for creation of the data correction value $c_2$. A data correction value $c_2$ created in this way is subsequently sent from the sending station MT to the receiving station AP in the uplink direction UL via interface V. Its emission power is, determined by the emission power on the previous emission plus/minus the received power difference, i.e. $Ic_2=Ic_1+\Delta Ic_1$.

The receiving station handles the data correction value $c_2^*$ now received just like the data value $c_1^*$ received beforehand, which means that in its turn it determines an analog power value and sends back this value digitized in the downlink direction DL to the sending station MT. In this station the power difference $\Delta Ic_2$ is again determined between the received power value $Ic_2^*$ and the sent power value $Ic_2=(Ic_1^*+\Delta Ic_1)$ in order to form a further data correction value $c_3$ on the sender side.

On the receiver side the received data $c_1^*$ and data correction values $c_2^*-c_4^*$ will be jointly processed to create the originally sent data value $c_1$. Particularly useful here is adding the data $c_1^*$ and the data correction values $c_2^*-c_4^*$ and the subsequent division by the number of added values. This procedure, also generally known as stacking, produces a data value which is largely cleansed of the effects of noise signals $n(t)$. The more data $c_1$ and data correction values $c_2-c_4$ are transmitted from the sending station MT to the receiving station AP, the more accurately the originally sent data value $c_1$ can be reconstructed on the receiver side. Usefully the totally number of transmissions of data and data correction values to be undertaken can however be limited to a prespecified number which forms 1 symbol consisting in the exemplary embodiment shown of 4 data and data correction values or so-called chips 1-4. Particular account should be taken of the fact that with an increasing number of transmissions, an increased rather than a reduced overall power consumption is to be observed.

Whereas with the exemplary embodiment shown, a correction for the last data correction value $c_4$ sent cannot be undertaken, for the case in which the noise signals $n(t)$ do not merely correspond to a statistical noise but for example contain a linear trend or additive supplement, statistical evaluation is also possible in order, especially for the last data correction value $c_4$ to be transmitted, to predetermine a likely distortion by the noise signal $n(t)$ and take it into account for generation of data correction value $c_4$. These types of advance corrections can naturally also be applied to the other data correction values $c_2$, $c_3$. An application of previously determined non-statistical correction values is also especially possible for data values of other data or of other symbols to be sent later.

A large number of alternate embodiments is possible for the exemplary embodiment shown, of which only individual examples are described below.

Instead of sending a data value or data $c_1$ in each case and the associated data correction values $c_2-c_4$ following on directly in the uplink direction UL, any type of scheme can also be introduced in which between the emission of the associated first data correction value $c_2$ or further data correction values $c_3$, $c_4$, data and data correction values of other original data are sent in each case. This means that the time required for the transmission, the receiver-side determination of the analog power and the return transmission as well as the send-side determination of a data correction value can be used by sending other data or data correction values.

Whereas with the exemplary embodiment described here the specified power difference was used to form a data correction value by addition of the original data value $c_1$ and the power difference value $DIc_1$, it is also possible to merely transfer the difference amount $DIc_1$ as data correction value to the receiving station AP. In the latter no addition of the received values and subsequent division by the number of added values is then undertaken, but merely an addition of all associated data and data correction values of a shared data origin would be undertaken in order to reconstruct the original data value $c_1$ as regards its original power $Ic_1$.

In a comparable way correction factors and such like can also be determined and applied.

There are various options for ensuring that transmission is as undisturbed as possible by noise signals $n(t)$ during transmission of the analog power values $Ic_1^*-Ic_3^*$. One is to select a power for the downlink transmission DL that is so high that the influence of noise signals $n(t)$ becomes negligible.

Another is however to use various correction methods which are known per se which use repeated transmissions with redundant data or coded data.

The procedure for sending data c1 and data correction values c2-c4 from the sending station MT to the receiving station AP is roughly comparable with the situation of a CDMA (Code Division Multiple Access) procedure in which only one repetition code is used for all chips.

In particular combinations of the method described in this document are possible, with addition data transmission security procedures or error correction procedures so that transmission security is further enhanced. Where the send energy or emission power Ic remains the same, if the correction methods described here are not adequate it is also possible to additionally increase the send energy Ic generally used by sending station MT for new transmissions. This can be automated especially if the basic emission power is increased on determining the difference power values AI for the case where increased power differences ΔI are established. Conversely the basic emission power Ic can automatically be reduced if, when determining the power differences, it is established that only minimal or negligible power differences are to be identified between the sent data and the received data.

Use of the method described in this document is especially useful for existing radio communications systems: in which the connections in the upstream direction from a network-side station to a subscriber-side station are often designed for transmitting larger volumes of data than those in the opposite direction. This applies especially to the areas of the internet for which large volumes of data are retrieved from remote data sources by individual subscriber-side stations MT via the corresponding access points or network-side stations AP. With these types of system it is also especially not very disadvantageous for the conversion of the power values received on the subscriber side into analog data and its transmission as digitized data to generally require a higher volume of data for the downlink transfer than the volume required for uplink transfer.

In the downlink direction DL highly-developed and expensive modulation methods can also especially be used to transfer back with negligible disturbance the analog reception power values Ic1*-Ic3* determined for the receiving data values c1*-c3*. In the originally sending station MT securely received data can be processed in this way with a low additional power outlay which is negligible in comparison to the saved emission power since the demodulation of the data sent back is possible in the originally sending station MT with only slight additional power for processing the data.

For further clarification a description with the appropriate numerical values will now be provided for the exemplary embodiment described here. While the sent data value c1 was transmitted with a standardized power value of Ic1=1-4, the effect of the additive noise or interference signal n(t) means that on the receiver side a data value c1* with a reception power value Ic1*=0.7 was received. This power value 0.7 will be fed back via the downlink channel DL to the sending station MT. This then sends, after determining the power difference ΔIc1=0.3 as a data correction value c2 a data correction value with a correspondingly increased emission power Ic2=1.3 instead of the normal emission power I=1.0. This procedure with a plurality of values corrected accordingly corresponds to a repetition code, meaning the final symbol entry or evaluation only takes place when all individual chips or data and correction values or the complete code word have been received.

Although this reduces the possible data rate when sending from the sending station MT with an increasing number of chips c1-c4, in the case of a system such as HiperLAN2 with very high data rates of 54 Mbit/s for example, it is possible despite this to achieve transmission data rates of several Mbit/s, which also allows transmission of a picture from a digital camera to the access point or the receiving station AP in just a few seconds.

The number of chips used can usefully be adapted and selected individually so that it is made dependent on the desired emission power and the desired data rate. This is done by undertaking the appropriate signaling to the receiving station in a first step, so that this also obtains knowledge of the number and sequence of the received data for a shared data origin in each case. By changing the number of data chips per symbol the required emission power can thus be reduced or increased accordingly. When this is done it is useful to take account of the fact that as from a certain number of transmissions a certain level of send energy is in its turn required for these transmissions, so that a minimization function is to be used to determine the idea combination of number of data chips and individual emission powers in relationship to overall power in each case.

Usefully the modulations, data rates and emission powers for the downlink transmission from the receiver side to the sender side are also optimized to avoid disturbance of the transmissions in the uplink direction UL or of other stations in the environment by for example excessive emission powers in the downlink direction DL.

First simulations have shown that for the transmissions in the uplink direction UL emission powers below the Shannon capacity are actually possible. This is made possible by the information returned in the downlink direction, in which case an uplink connection channel can usefully be introduced for the downlink direction as a new superchannel which has a greater Shannon capacity than the uplink connection taken as such alone.

The proposed procedure can especially be used with OFDM (OFDM: orthogonal Frequency Division Multiplex) systems since OFDM extends the duration of each symbol. Thus the time for the round-trip delay for recording the received signal and its underlying signal processing and transmission in the downlink channel DL can be increased as much as is required. Each subcarrier of the OFDM symbol would be handled in parallel, which means that it would be given a separate channel in the downlink direction DL in each case. For greater round trip delays it is also possible to form a loop not with the next symbol in each case, but with a later symbol, meaning that symbol 1 is transmitted in upstream direction UL, with the downstream information being transmitted in a symbol 4 in the corresponding downlink channel DL. After symbol 1 symbol 2 would be transmitted in the uplink direction UL and the assigned downlink information in symbol 5 in the downlink direction etc.

The downlink channel DL transmits digitally coded analog values, which means that the quantization level is of interest. A method for reducing the quantization level is to store the quantization errors for each chip or data value and data correction value transmitted and to take account of this error value for the next value in the downlink channel DL so that the overall error is reduced.

Power value or reception power value here in particular mean the actual amplitudes of the received signal on the receiver side. Thus cases are also taken into account in which, instead of a positive reception power value, a reception power value with negative amplitude is received or entered. In particular positive and negative amplitudes when a signal is emitted can also be correctly recorded and processed by the method. In particular the amplitude values are transmitted with the appropriate leading sign in the downlink direction.

The invention claimed is:

1. A method for controlling the emission power, comprising:
   transmitting a signal for transmission of data from a sending station to a receiving station;
   determining a measured value of the signal received at a receiving station, wherein the received signal depends on the data transmitted by the signal, and the measured value is a reception power amplitude value of the data received by the receiving station with the signal; and
   transmitting the received signal from the receiving station to a sending station, wherein the measured value of the received signal is transmitted as control information for controlling an emission power, and wherein the sending station, after receiving a previous measured value of previously sent data, sends correction data for the previously sent data to the receiving station which depends on the relevant measured value.

2. The method in accordance with claim 1, wherein the sending station determines from the measured value the extent to which the emission power of the previously sent data deviates from the reception power of the received data at the receiving station and subsequently sends one of data and data correction values with an emission power correction.

3. The method in accordance with claim 1, wherein the measured value is sent back in such as way as to minimize interference effects during transmission.

4. The method in accordance with claim 1, wherein the correction data correspond to a correction factor or an additive correction value.

5. The method in accordance with claim 1, wherein, regarding deviation between sent power amplitude values and received power amplitude values, a statistical evaluation is performed and taken into account for future transmissions of one of data and data correction values.

6. The method in accordance with claim 1, wherein the sending of the signal with the data is undertaken with an emission power below a Shannon capacity, and the sending back of the assigned measured value is undertaken above the Shannon capacity.

7. The method in accordance with claim 6, wherein the measured value is sent back from the receiving station with a higher emission power than the emission power of the original sending station.

8. The method in accordance with claim 6, wherein the measured value is sent back using an encoding or redundancy method.

9. The method in accordance with claim 1, wherein the correction data exists as newly transferred data.

10. The method in accordance with claim 9, wherein the correction data is created from the originally sent data with an additive or subtractive power difference and on the receiver side the correction data is processed with the original data added to it and divided by the number of added values.

11. The method in accordance with claim 9, wherein, after data is sent, the data which has been corrected is transmitted repeatedly a specified number of times and jointly processed on the receiver side.

12. A receiving station for a communications system, comprising:
    a device for determining a measured value of a received signal which depends on the data transmitted by the signal, wherein the measured value is a reception power amplitude value of the data received with the signal;
    a device for sending the measured value to a station sending the signal as control information for controlling the emission power of the sending station; and
    a device for receiving correction data sent from the sending station for the data sent previously, with the correction data depending on the relevant measured value.

13. A sending station for a communications system, comprising:
    a send device for transmitting data by means of a signal to a receiving station;
    a receive device for receiving a measured value of the signal received by the receiving station which is dependent on the data transmitted by the signal, wherein the measured value is a reception power amplitude value of the data received with the signal;
    a device for controlling the emission power which takes account of the measured value as control information when controlling the emission power; and
    a device for sending correction data for previously transmitted data, with the correction data depending on the measured value.

* * * * *